T. E. MURRAY, Jr., AND J. B. MURRAY.
WELDING MACHINE.
APPLICATION FILED FEB. 1, 1921.
1,420,735.
Patented June 27, 1922.
2 SHEETS—SHEET 1.
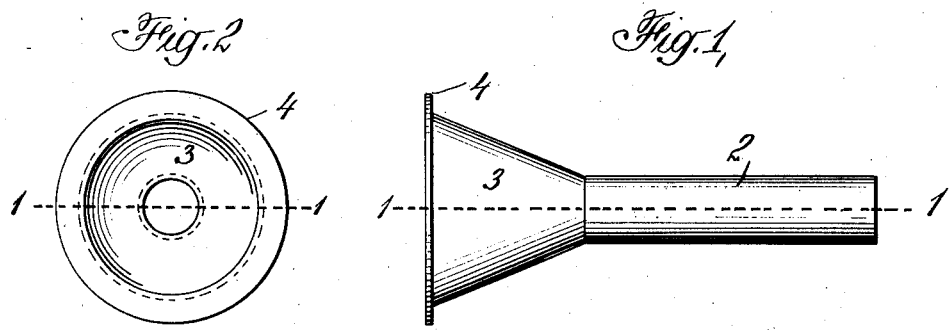
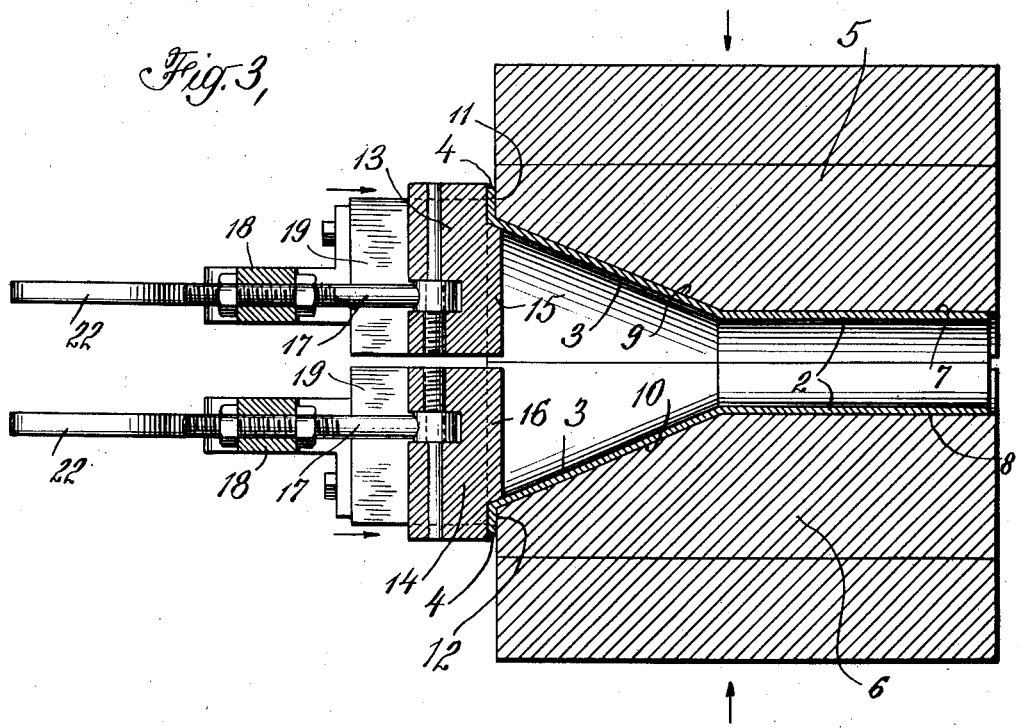
Inventors
T. E. MURRAY, Jr.
J. B. MURRAY
By Attorney

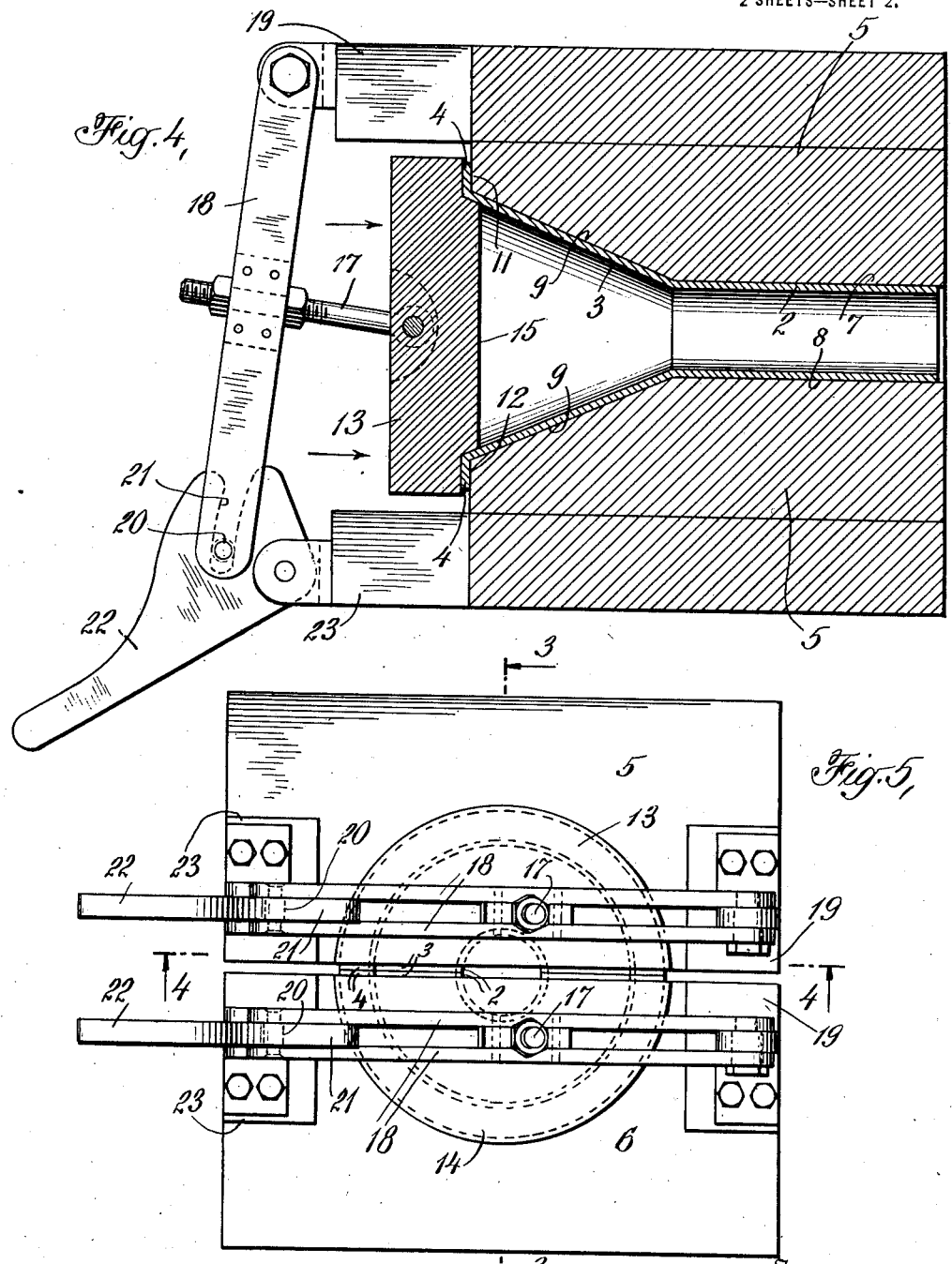

UNITED STATES PATENT OFFICE.

THOMAS E. MURRAY, JR., AND JOSEPH B. MURRAY, OF BROOKLYN, NEW YORK.

WELDING MACHINE.

1,420,735.  Specification of Letters Patent. Patented June 27, 1922.

Application filed February 1, 1921. Serial No. 441,561.

*To all whom it may concern:*

Be it known that we, THOMAS E. MURRAY, Jr., and JOSEPH B. MURRAY, citizens of the United States, and residents of Brooklyn, New York, have invented certain new and useful Improvements in Welding Machines, of which the following is a specification.

In previous applications for patent we have described a machine and process for welding parts together by the passage of currents of extraordinarily large volume continuing for a fraction of a second.

The present invention relates to improvements in machines for welding by this method, and applicable also to electric welding generally.

The accompanying drawings illustrate an embodiment of the invention.

Figs. 1 and 2 are respectively a side elevation and an end view of an article to be made by welding segments together in the present machine;

Fig. 3 is a longitudinal section through the welding electrodes and related parts on the line 3—3 of Fig. 5;

Fig. 4 is a horizontal section on the line 4—4 of Fig. 5 and Fig. 5 is an end view.

The invention is particularly directed to facilitating the welding of segments which have flanges transverse to the edges of the bodies of the segments, as in the example shown in Figs. 1 and 2. These figures illustrate one end portion of an automobile rear axle comprising segments joined along edges illustrated by the dotted line 1—1. The body portion 2 of each segment is semicylindrical and merges into a conical extension 3 on the edge of which is a flange 4. In welding these segments together, the flanges 4 tend to vibrate under the shock produced by the current and this vibration makes it difficult to bring the meeting edges of the flanges together accurately. This is a considerable difficulty, particularly with thin sheet metal. The same difficulty is experienced, though to a lesser degree with oblique flanges, and we use the word "transverse" here to include such flanges as well as those which, like the flanges 4, are at a right angle to the welded edges of the bodies of the segments. Also, in order to secure the maximum flow of current through the edges of such flanges it is important to have them make a good contact with the electrodes, and this is less easy than for the body portion 2 of the segments, since the direction of the pressure of the electrodes is directly at right angles to the edges to be welded. We propose to secure a good contact of the flanges and also to hold them against vibration by pressing the flanges sidewise against the electrodes. The principle may be applied, as we have said above, not only to rectangular flanges, but also to oblique flanges, and it may be applied to one or more such segments, and not only to segments of the shape illustrated but to segments of various other shapes having transverse flanges.

And it will be understood that the invention is useful in holding the flanges against vibration and with their meeting edges accurately aligned even where, as in some constructions, the welding is not to be applied to the flanges but only to the remainder of the segments.

Fig. 3 shows in vertical section the shapes of the upper and lower electrodes 5 and 6, which are identical in this case because the two segments are identical. Where the two segments are not exactly alike, the shapes of the electrodes will be correspondingly changed.

The upper electrode is pressed down in the direction of the arrow, and the lower electrode, though usually it will be stationary, will exert a reaction in the opposite direction. The electrodes have faces 7 and 8 respectively bearing against the body of the work and to which the pressure is at right angles. They have also faces 9 and 10 respectively which fit the parts 3 of the segments and are pressed against them obliquely. Their side faces 11 and 12 are fitted to engage the flanges 4 of the segments, but obviously they will not be pressed against such flanges by the pressure of the electrodes. We, therefore, add to the machine pressers 13 and 14 respectively engaging the outer faces of the flanges and pressing against the same in the direction of the arrows shown, so as to clamp them against the electrodes and thus hold them against vibration during the welding operation and also to ensure good contact with the electrodes so as to convey the maximum amount of current to the flanges and to their meeting edges which are to be welded. The pressers 13 and 14 have also conical extensions 15 and 16 entering the conical portions 3 of the segments to a greater or less extent according to the circumstances of the work in hand and pressing these against the electrodes so as to hold them rigidly and to secure a good contact.

Each presser is mounted on its electrode so as to move with it and is arranged to be moved to and from its clamping position so as to permit the insertion of the work.

Referring to Figs. 4 and 5 it will be seen that each of the pressers is swivelled on the end of a bolt 17 which is adjustably mounted on an arm 18 which is composed of two parallel bars (Fig. 5) pivoted at one end on a bracket fastened to a lug 19 projecting from one side of the electrode. The opposite end of the arm carries a pin 20 with an antifriction roller traveling in a cam slot 21 formed in an extension of a hand lever 22 which is pivoted on an extenson 23 from this side of the electrode. The throwing of the handle 22 outward forces the arm 18 outward and withdraws the presser, the end of the slot 21 being open so that the operator may take hold of the arm 18 and swing it clear around out of the way to permit the introduction and withdrawal of the work. When a new piece of work is inserted the presser is set in place against the flange and the pin 20 introduced into the open end of the slot 21. Then the forcing of the lever 22 inward cams the presser firmly against the work. The electrodes are then brought together and supplied with current as usual.

The invention is applicable not only where two identical segments are welded as in the case illustrated, but also where the segments are of different shapes and where there are more than two segments. And in some cases the invention may be applied to only one of the segments which are to be united.

Though we have described with great particularity of detail certain specific embodiments of our invention, yet it is not to be understood therefrom that the invention is restricted to the particular embodiments disclosed. Various modifications in detail and in the arrangement of the parts may be made by those skilled in the art without departure from the invention as defined in the following claims.

What we claim is:

1. A machine for electrically welding together segments having flanges transverse to the edges to be welded, said machine including in combination electrodes, and means for holding said flanges properly alined during the welding operation.

2. A machine for electrically welding together segments having flanges transverse to the edges to be welded, said machine including in combination electrodes and means for pressing said flanges sidewise against said electrodes.

3. A machine for electrically welding together segments having flanges transverse to the edges to be welded, said machine including in combination electrodes and a presser connected to each electrode and adapted to press the flange against its electrode.

4. A machine for electrically welding segments having conical portions including in combination electrodes adapted to bear on the outer face of said portions and pressers having parts entering said conical portions and holding them firmly against the electrodes.

5. A machine for electrically welding together segments of a tubular product along longitudinal edges, said machine including in combination electrodes adapted to bear on the outer faces of said segments, and means engaging the inner faces of said segments and pressing them firmly against the electrodes.

6. A machine for electrically welding flanged segments of sheet metal along their edges, said machine including in combination means for pressing said edges together and passing a welding current through them and means for holding said flanges properly aligned during the welding operation.

7. A machine for electrically welding flanged segments of sheet metal along their edges, said machine including in combination means for pressing said edges together and passing a welding current through them and means for pressing said flanges firmly against a conducting part of the machine to secure a good flow of current between the edges of the flanges.

In witness whereof, we have hereunto signed our names.

THOMAS E. MURRAY, JR.
JOSEPH B. MURRAY.